A. B. HUTCHINS.
Assignor to J. L. SHARP.
HYDROCARBON STOVE.
No. 10,273. Reissued Jan. 16, 1883.
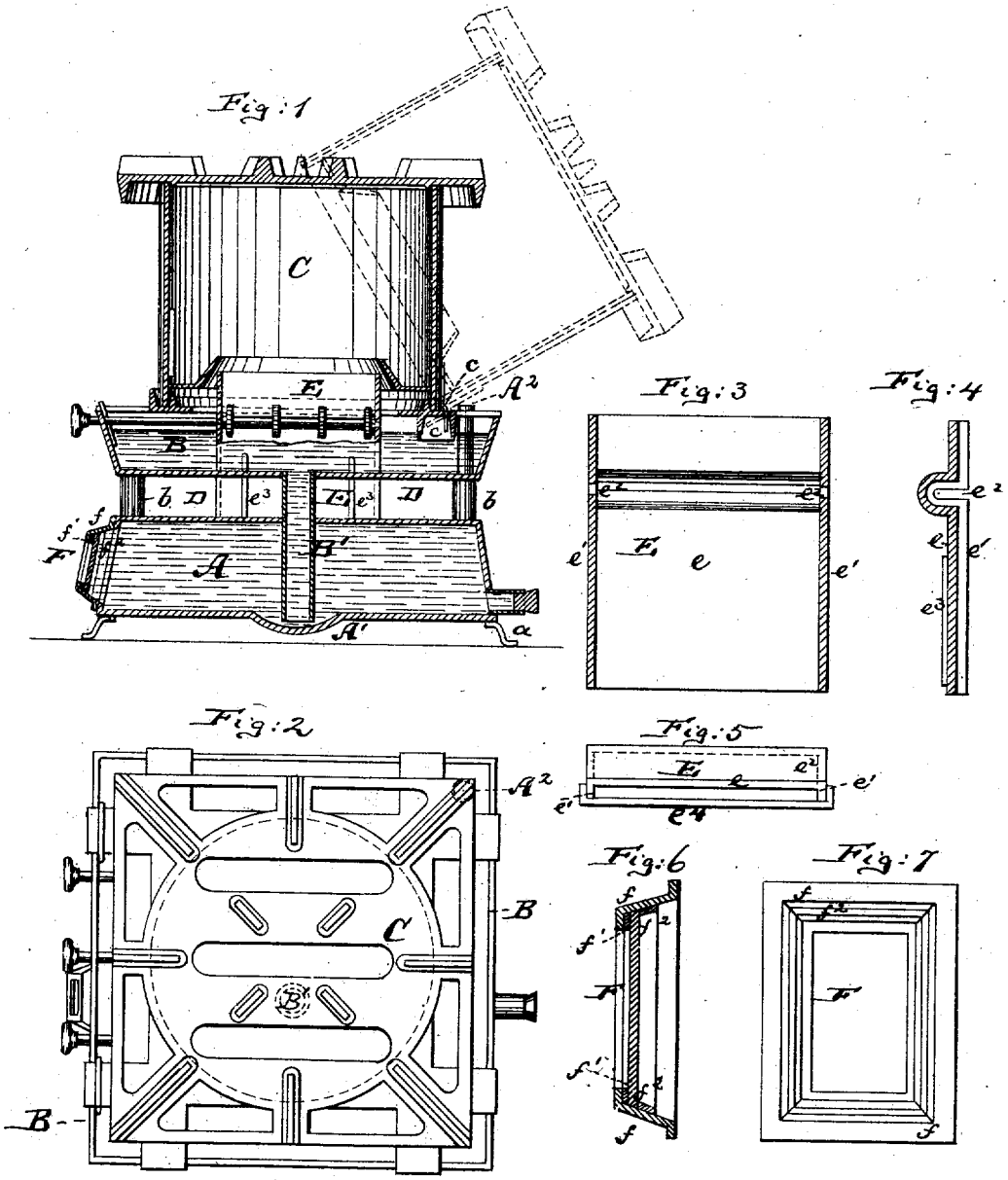
Witnesses:
John C. Tunbridge
Sam'l R. Betts
Inventor:
Abner B. Hutchins
by his attorneys
Briesen & Betts
N. PETERS, Photo-Lithographer, Washington, D. C.

UNITED STATES PATENT OFFICE.

ABNER B. HUTCHINS, OF BROOKLYN, ASSIGNOR TO JAMES L. SHARP, OF NEW YORK, N. Y.

HYDROCARBON-STOVE.

SPECIFICATION forming part of Reissued Letters Patent No. 10,273, dated January 16, 1883.

Original No. 194,242, dated August 14, 1877. Application for reissue filed October 10, 1882.

*To all whom it may concern:*

Be it known that I, ABNER B. HUTCHINS, of Brooklyn, in the county of Kings and State of New York, have invented a new and useful Improvement in Hydrocarbon-Stoves; and I hereby declare the following to be a full and clear description of the same.

This invention relates to a hydrostatic water-pressure exerted upon the hydrocarbon fluid, so as to keep it raised up to an altitude at least equal to the height of the surface of the water in water-tank, which is usually interposed between the top of the oil-reservoir and the burners that heat the stove.

The invention also relates to certain details of construction, which will be hereinafter more fully described, and the whole will be readily understood by reference to the accompanying drawings, of which—

Figure 1 is a sectional elevation of the improved stove, showing in full lines the completed stove and its appurtenances as in use, and in dotted lines the top part of the stove tipped back on its peculiar hinge in such position as to render the top parts of the wicks accessible for trimming or lighting. Fig. 2 is a general plan of the stove. Fig. 3 is an elevation of one side of the wick-tube. Fig. 4 is a central sectional elevation of it. Fig. 5 is a plan of wick-tube. Fig. 6 is a detail sectional elevation of the window-light that provides for observation of the state of the oil in the reservoir. Fig. 7 is an inside elevational view of the said window-light removed from the stove.

This stove consists of three general parts—viz., base or oil-reservoir A, the upper or water reservoir, B, and the general stove-top C. The reservoirs A and B are rectangular in form, preferably, and the lower one, A, is supported on short feet *a*, while short posts *b* separate these two reservoirs, so as to form an air-passage, D, between them. The posts *b* should be secured to the top of vessel A and the bottom of vessel B, so as to hold them firmly together. The vessel A should be formed with a well, A′, at its bottom, the size of which well should be, say, two inches in diameter, more or less, and about a half an inch deep. A tube, B′, will lead from the bottom of the reservoir B to near the bottom of the before-mentioned well in the bottom of A, thus passing through the top plate of the vessel A, to which it will be securely soldered, as well as to the bottom plate of B. A feeding-tube, $A^2$, which is to be used to pour the fluid through into the chamber A, may be most conveniently extended down through the chamber B, being of course thoroughly soldered to the walls of said reservoir, through which it passes. An easily-removable cap will be provided to cover and protect the top end of the tube $A^2$. A similar feeding-tube will be provided to supply the chamber B, except of course that it will only pass through and be soldered to the top plate of the reservoir B.

The wick-tubes E, the construction of which will be hereinafter more fully described, also pass completely through the top reservoir, B, and the air-space D, and these tubes will be thoroughly soldered to the walls of the reservoirs through which they pass.

The top part of the stove, C, presents no new features, except in regard to the short foot-piece *c*, which is riveted to one side of the casing of C, near its bottom, and arranged to extend below the bottom of C and down into a mortise or slot in the top plate of reservoir B, on which said top plate the top part of the stove, C, rests. This foot-piece *c* being straight, the top part of stove may be easily set down upon its seat on top of B, and thus the parts of the stove may be readily assembled together or taken apart when required, and the foot-piece will hold the top part of the stove and its base together, as by a hinge, when the top part of the stove is tipped back, as shown by the dotted lines of Fig. 1.

There will be a window, F, placed in the side of the lower or oil reservoir, for the purpose of disclosing to the operator the quantity of oil in the said reservoir. This window and its fixtures will consist of a small frame, *f*, which is to be soldered or otherwise permanently fixed to the side of the reservoir A, a rubber or other suitable packing, *f′*, interposed between the said frame and the glass F, and an inside stop, $f^2$, arranged in some suitable manner, so as to hold the glass firmly against its packing-strip *f′*. The object of this window, as has been stated, is to enable the attendant to observe at all times the exact amount of oil in the reservoir, and its use becomes a necessity in view of the fact that the said reservoir is always full, partly of water and partly of oil, and without the aid of the window it would be impossible to tell just how much of the contents of the said chamber was oil and how much was water.

Each wick-tube E is constructed with one side, $e$, and the two edges $e'$ of the tube made solid in one piece of cast metal. The remaining side, $e^4$, of the wick-tube is to be made of sheet metal, soldered to the two edge flanges $e'$ of the plate $e$. The side $e^4$ of the tube may be turned over the edges of the flanges $e'$, as in Fig. 5.

The stove constructed as above described, the lower vessel or reservoir, A, will be filled or partly filled with some suitable hydrocarbon, and the upper vessel or reservoir, B, will be filled or partly filled with water, which will descend through the tube B′ into the well A′, and as the water is of a greater specific gravity than the hydrocarbon, the water will always remain at the bottom in the vessel A and force the hydrocarbon into the top part of the reservoir A; but it cannot escape upward through the tube B′ into the reservoir B, because it cannot gain access to the bottom end of the said tube, the said bottom end of the tube being submerged in the water in the well A′.

The hydrostatic pressure of the water will force the hydrocarbon up into the wick-tubes as high as the top of the water in the vessel or reservoir B, and capillary attraction will of course cause it to rise some higher, thus securing the presence of the oil high up on the wicks, in close proximity to the burners, while the reservoir of oil is far below and separated from the influence of the flame by the interposed water and air spaces.

There are lugs $e^3$ formed on the side of the cast part $e$ of the wick-tubes, which serve as stops and guides to strike the top plate of A when the parts are assembled, and thus regulate the heights of the said tubes, and also thereby place the seats $e^2$ in line.

I claim—

1. The wick-tube E, formed of one cast part, $e$, having seats $e^2$ for the shaft of the wick-elevator, and flanges $e'$ $e'$, all made in one piece, and of another sheet-metal part, $e^4$, secured to the flanges $e'$, substantially as and for the purpose set forth.

2. The foot-piece $c$, attached to the side of the top of stove, C, near its base, and arranged to fall into a slot or mortise in the top plate of reservoir B, on which the said top part, C, rests, to assemble the parts together, and also to act as a hinge or coupling when the top part of the stove is tipped over into a convenient position for lighting, substantially as described and set forth.

ABNER B. HUTCHINS.

Witnesses:
WILLY G. E. SCHULTZ,
WILLIAM H. C. SMITH.